(No Model.)
A. CAREY.
STOCK WATERING DEVICE.
No. 493,478. Patented Mar. 14, 1893.
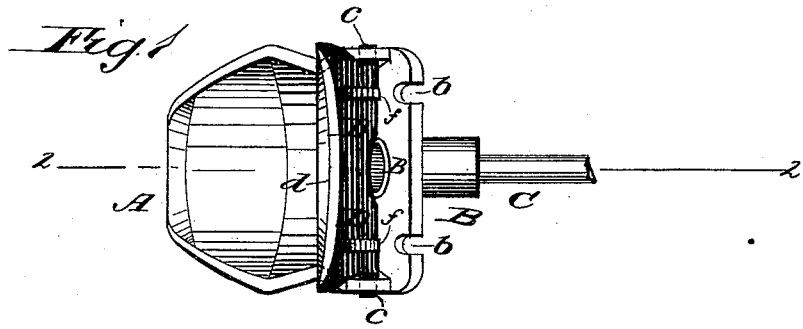
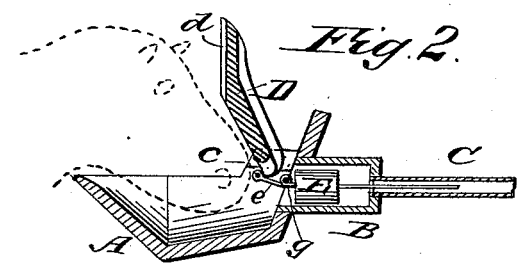
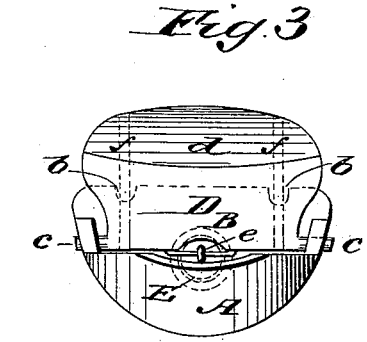
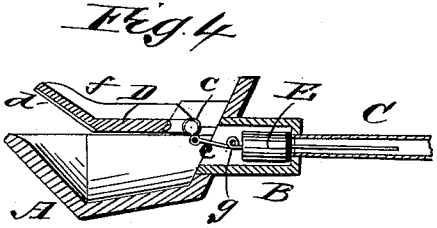
WITNESSES:
INVENTOR
BY
ATTORNEYS.

UNITED STATES PATENT OFFICE.

ANSON CAREY, OF ASHLAND, NEBRASKA.

STOCK WATERING DEVICE.

SPECIFICATION forming part of Letters Patent No. 493,478, dated March 14, 1893.

Application filed July 15, 1892. Serial No. 440,143. (No model.)

*To all whom it may concern:*

Be it known that I, ANSON CAREY, of Ashland, in the county of Saunders and State of Nebraska, have invented new and useful Improvements in Stock Watering Devices, of which the following is a full, clear, and exact description.

This invention consists in a device for watering hogs and other stock or cattle, of novel construction and which is automatic in its action, substantially as hereinafter described and more particularly pointed out in the claims.

Reference is to be had to the accompanying drawings forming a part of this specification, in which similar letters of reference indicate corresponding parts in all the figures.

Figure 1 represents a plan view of the device with its lid or nose-gate thrown up or back. Fig. 2 is a vertical section of the same upon the line 2—2 in Fig. 1. Fig. 3 is a front elevation; and Fig. 4 is a similar section to Fig. 2, but showing the lid or nose-gate as down and the stopper which shuts off the supply as closed.

A, indicates an elbow-shaped trough having a tubular extension B in its rear, into which water is passed to supply the trough by or from a supply pipe C, in line with the tubular extension and which may be connected with a water tank, barrel or other source of water supply. The back end of the trough occupies a raised position and has upper open-ended slots or depressions $b, b$, in it for attachment by screws to any suitable fixture.

D is a nose-gate or lid, loosely mounted on the trough and hinged as by rear trunnions $c, c$, to the sides of the trough in front of the back of the latter and made, when down, to rest on the sides of the trough except at its front end $d$ which inclines upward forming a lip and leaving the mouth end of the trough open above, as shown in Fig. 4, to admit of the animal inserting its nose under the lip $d$ of the lid so as to raise the lid when the animal requires to drink. Attached to the rear or hinge portion of this nose-gate or lid D, as by a rod $e$, is a plug or stopper E arranged to fit loosely, with egress passage for the water all around it, within the tubular extension B and so that when the nose-gate D is down to its place, it closes the stopper E against or within the water supply orifice or pipe C to shut off ingress of water to the trough, but when the nose-gate D is raised by the nose of the animal coming to drink, it draws forward the stopper E and opens the supply pipe or orifice C to replenish the trough A with fresh water each time. Said nose-gate or lid D has ribs $f, f$ on its back which not only strengthen it but add to its weight, so that after it has been partly raised by the nose of the animal, but not fully thrown back, and the animal leaves the trough after drinking, it will fall to its seat by gravity, being made of metal or sufficiently heavy for the purpose, and force the stopper E quickly and tightly backward to close the supply orifice or pipe C against further ingress of water to the trough. To this end and to better secure the tight closing of the stopper E, without injurious jar or breakage, the rod $e$ connecting the nose-gate D with the stopper E is made with a twist or curl $g$ in it which, in a measure, forms a spring. According to the extent to which the nose-gate D is raised will the supply of water be gaged to the trough and the animal using the trough will always have a supply of fresh water to drink, without waste of the water when he has finished drinking, by reason of the automatic action of the device, and when the nose-gate has closed itself, all waste of water is stopped but the trough is open in front for ventilation and to admit of chickens or the like drinking from it.

The device is applicable to watering different or all kinds of stock.

Having thus described my invention, I claim as new and desire to secure by Letters Patent—

1. A device for watering stock, consisting of a trough provided with a water supply orifice or pipe in its rear, a gravitating lid or nose-gate hinged or pivoted in its rear adapted to close down on said trough, and having an upwardly and outwardly inclined lip at its forward end arranged, when the lid is down, to leave the top of the trough open in front, and a stopper to said supply pipe or orifice pivotally connected with said hinged nose-gate for operation by the latter, in both directions substantially as specified.

2. The combination, of the trough A, having slot-like screw holes $b, b$, a tubular backward extension B, and water supply pipe C, in its rear, the hinged gravitating lid or nose-gate D, having an upward open inclined lip $d$, and back ribs $f$; the stopper E, and the rod $e$, connecting the nose-gate with said stopper and constructed with a curl or twist $g$, essentially as shown and described.

ANSON CAREY.

Witnesses:
OSCAR HOFFMAN,
JOSEPH ARNOLD.